United States Patent [19]

Suzuki

[11] 3,833,081

[45] Sept. 3, 1974

[54] FLUID POWER STEERING MACHINE
[75] Inventor: Akira Suzuki, Nishio, Japan
[73] Assignee: Aisin Seiki Kabushiki Kaisha, Kariya, Aichi Pref., Japan
[22] Filed: Aug. 11, 1972
[21] Appl. No.: 279,776

[30] Foreign Application Priority Data
    Aug. 26, 1971  Japan.............................. 46-65366

[52] U.S. Cl. ............................................ 180/79.2
[51] Int. Cl............................................. B62b 1/00
[58] Field of Search................... 180/79.2 R; 91/372

[56]         References Cited
          UNITED STATES PATENTS
3,408,900  11/1968  Tomita........................... 180/79.2 R
3,553,966   5/1969  Liebert........................... 180/79.2 R
3,613,364  10/1971  Goff................................ 180/79.2 R Primary Examiner—Richard E. Aegerter
Attorney, Agent, or Firm—Pierce, Scheffler & Parker

[57]        ABSTRACT

A fluid power steering mechanism for a vehicle comprising an operating rod operably connected with dirigible wheels through an actuator, a manually operable steering shaft coaxially with said operating rod and elastically connected with the same through a resilient means, a control valve means provided in said operating rod and operating said actuator by relative rotational displacement of said operating rod and steering shaft and a resistant means whereby said resistant means are communicating with a fluid pressure source generating a pressure in response to the vehicle speed and obtaining a steering resistance in response to the vehicle speed for a steering wheel cooperably connected to said steering shaft.

5 Claims, 4 Drawing Figures

FLUID POWER STEERING MACHINE

BACKGROUND OF THE INVENTION

This invention relates generally to a fluid power steering mechanism and more particularly to a steering resistance system therein which operates proportionately with vehicle speed.

In the operation of a power steering, it has been found desirable to apply a steering resistance to a steering wheel for preventing a sudden or too much turn of a vehicle driving at high speed.

Stated in other words, a most serious drawback of the conventional power steering mechanism is that a slight operation of a steering wheel of the vehicle running at high speed might turn the vehicle too much to upset it.

SUMMARY OF THE INVENTION

It is, therefore, a main object of the present invention to provide an improved fluid power steering mechanism which can overcome above described conventional drawback and yet maintain power steering functions being desirable for about-town driving or parking.

A further object of the present invention is to provide a resistance system compactly and easily constructed in a fluid power steering mechanism. Another object of the present invention is to provide such an improved fluid power steering mechanism which can obtain a steering resistance for a steering wheel proportionately with vehicle speed. Other objects and attendant advantages of the present invention will become more apparent as the specification is considered in connection with the attached drawings.

DETAILED DESCRIPTION OF THE INVENTION

Figure 1:
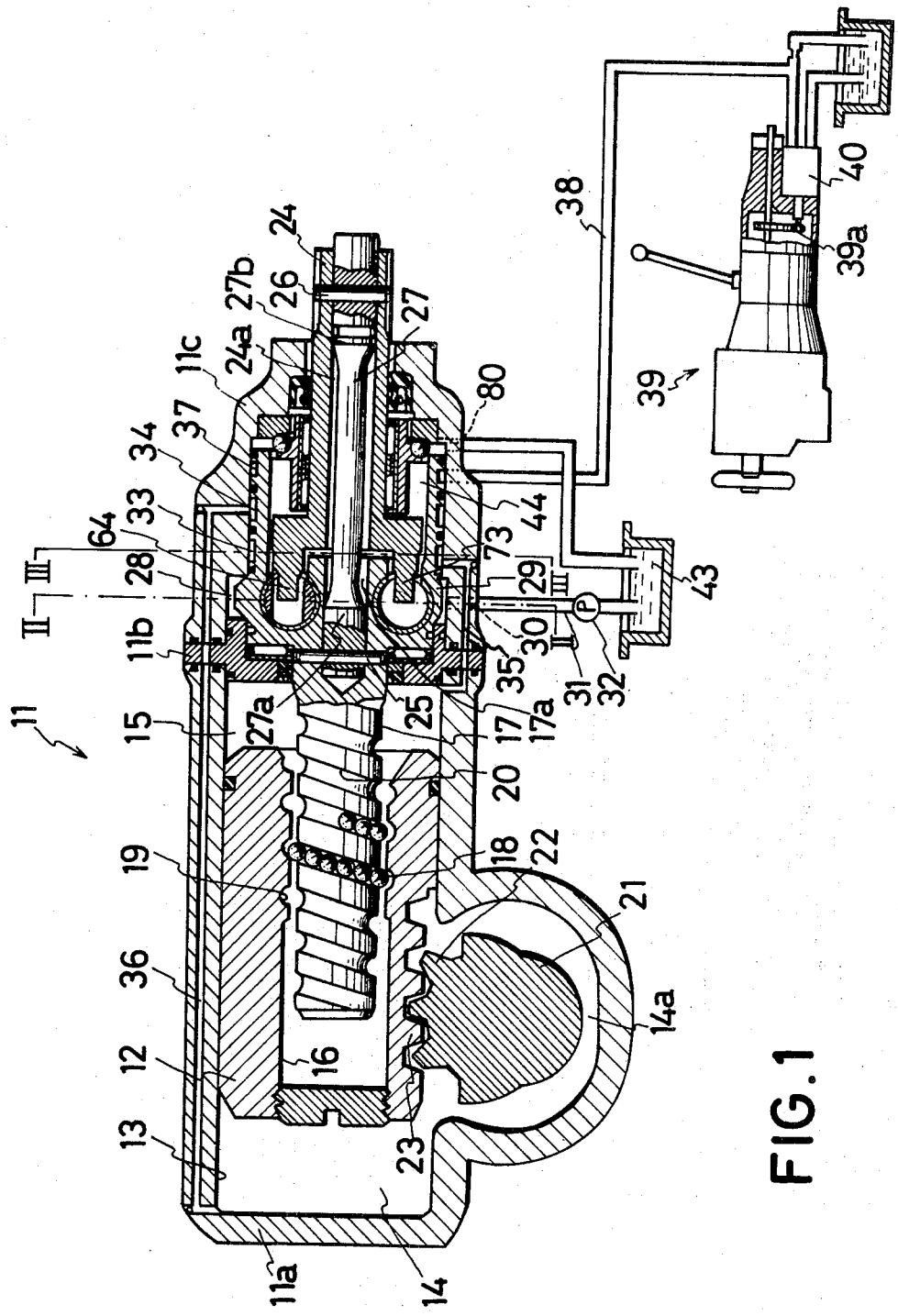
FIG. 1 is a longitudinal sectional view of a fluid power steering mechanism in accordance with the present invention.

Referring now to the drawings, wherein is shown an integral type power steering mechanism. The numeral 11 denotes a main body, which is consisted of three parts, i.e., a gear housing 11a, divider 11b and valve housing 11c. A piston 12, which has a bore 16 therein, is slidably installed in a cylinder 13 being formed on the gear housing 11a and devides the cylinder 13 into two fluid chambers 14 and 15. This piston 12 is engaged with an operating rod 17 via a train of ball bearings 18 being interposed between a helical groove 19 on the inner surface of the bore 16 and a complementary helical groove 20 on the peripheral surface of the left-hand side of the operating rod 17 as shown in FIG. 1. The ball bearings 18 are arranged so as to circulate the complementary grooves 19, 20. The piston 12 is provided with a usual gear rack 23 which coacts with a plurality of teeth 22 of a gear sector 21 for actuating vehicle wheels, not shown, through connecting means therewith, also not shown. A steering shaft 24 being provided in the valve housing 11c is connected at the right end thereof as is viewed in FIG. 1, to a well known steering wheel or handle, not shown, and has an axial bore 24a therein. This shaft 24 is arranged coaxially with the operating rod 17. A torsion bar 27 is concentrically provided within the bore 24a of the steering shaft 24 and a bore 17a of the operating rod 17 which is bored coaxially with the bore 24a in the right-hand side of the rod 17. The shaft 24 and the rod 17 are elastrically connected each other through the torsion bar 27 by means of pins 25, 26, respectively, that is, an enlarged left end portion 27a of the torsion bar 27 is keyed to the shaft 17 to rotate therewith by means of the pin 25 and an enlarged right end portion 27b of the torsion bar 27 is keyed to the shaft 24 to rotate therewith by means of the pin 26.

An annular chamber 28 is formed between a peripheral portion 29 of the rod 17 and an inner surface of the valve housing 11c and communicates with a pump 32 via a passage 30 which is formed in the valve housing 11c and a conduit 31 which communicates therewith.

Annular chamber 33, 34 and 37 are also formed between the peripheral portion 29 of the rod 17 and inner surface of the valve housing 11c. The annular chamber 33 communicates with the fluid chamber 15 via a flow passage bore 35 while the annular chamber 34 communicates with the fluid chamber 14 via a flow passage bore 36.

Figure 2:
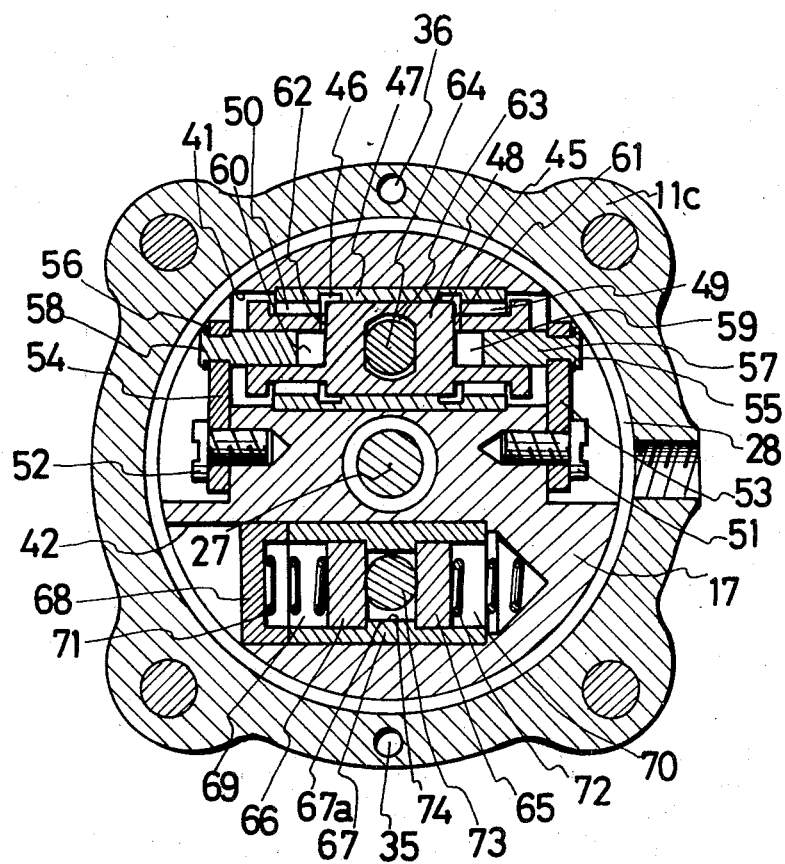
FIG. 2 is a cross sectional view of the fluid power steering mechanism of FIG. 1, taken along the plane of line II—II therein.
Figure 3:
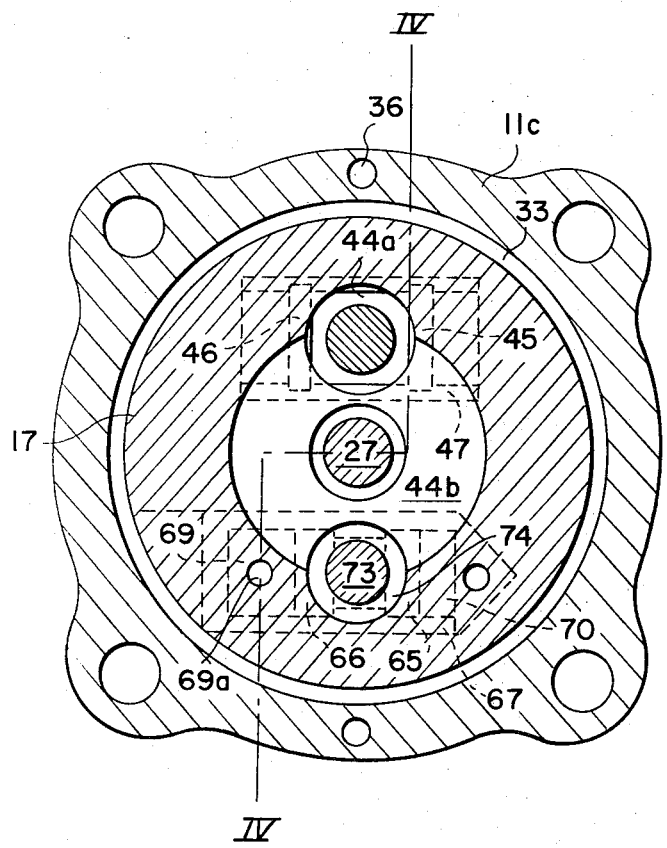
FIG. 3 is a cross sectional view taken along line III—III of FIG. 1.

The annular chamber 37 communicates with a gear pump 40 provided in a well known transmission mechanism 39 via a conduit 38. The gear pump 40 is kept in meshing with an output gear 39a of the transmission mechanism 39 and generates fluid pressures proportionately with the vehicle speed. In other words the arrangement is so constructed that higher the vehicle speed becomes, the amount of the fluid emission from the pump 40 becomes greater and the fluid pressures therein accordingly becomes higher. A pair of vertical bore 41, 42 is provided in the rod 17 as is shown in FIG. 2 and press two valve bushes 47, 67 respectively thereinto. The valve bush 47 provides an axially slidable valve spool 48 therein and formes two annular grooves 45, 46 therebetween which communicate with a reservoir 43 via channels 44a and 44b, as clearly shown in FIGS. 3 and 4, and an annular space 44 which is provided between the peripheral portion 29 of the rod 17 and the steering shaft 24. Two opposed pistons 57, 58 slidably disposed in the valve spool 48 are fixed to plates 54, 53 by means of snap rings 56, 55 respectively. These plates 53, 54 are also fixed to the operating rod 17 to rotate therewith by means of bolts 51, 52 respectively. Annular grooves 49, 50 which are formed between a peripheral surface of the valve spool 48 and inner surface of the valve bush 47 are communicated with the fluid chambers 15, 14 respectively via the chambers 33, 34. Reaction chambers 59, 60 provided between the valve spool 48 and two pistons 57, 58 are communicated with the annular grooves 49, 50 via flow passages 61, 62 which are formed in the valve spool 48. The numeral 63 is a bore vertically perforating in regard to the valve spool 48 and engaging with a pin 64 which is integrally formed with the steering shaft 24.

Figure 4:
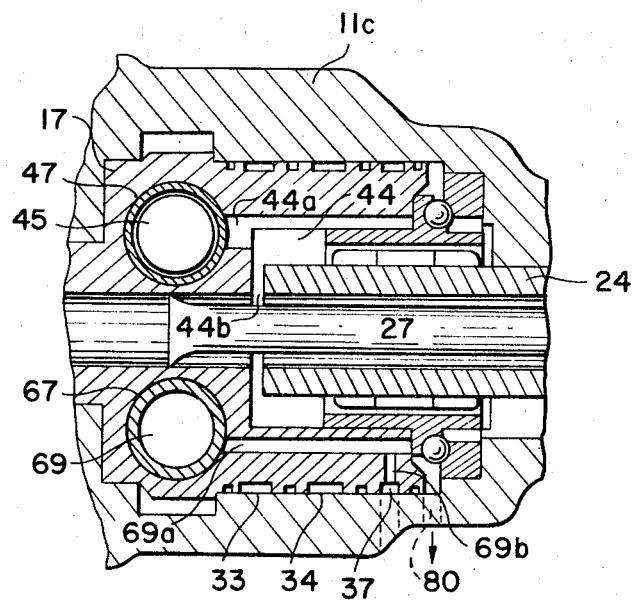
FIG. 4 is a cross sectional view taken on line IV—IV of FIG. 3.

Two opposed free pistons 65, 66 are provided in the valve bush 67 and two pressure chambers 69, 70 are formed between the piston 66 and a plug 68 of the bush 67, piston 65 and the right end of the bore 42 respectively as is viewed in FIG. 2. These two chambers 69, 70 are communicated with the annular chamber 37 via a lateral bore 69a and a vertical bore 69b as shown in FIG. 4. The spring members 71, 72 are provided into the chambers 69, 70 respectively to bias the free pistons 66, 65 to a shoulder portion 67a of the valve bush 67. The free pistons 65, 66 are engaging with a pin 73 which is integrally formed with the steering shaft 24 as is shown FIG. 2. The bore 74 being provided between two pistons 65, 66 are communicated with the annular space 44.

Sealing means and bearing means used in this invention especially in FIG. 1 are shown without refference numbers except the ball bearings 18. But the functions and structures thereof are well known to the skilled in the art and no hindrance will be occured to disclose this invention.

In operation:

It is now assumed that the vehicle is running straight ahead and thus, the steering wheel is positioned at its neutral position. The open center type valve 48 intercommunicates all the fluid paths and chambers associated therewith and fluid fed under pressure from the pump 32 will circulate through all the flowable parts without doing practically any work. Under this condition, therefore, the pressures between the fluid chambers 14, 15 are equalized, so that any movement is not caused to the piston 12. When the steering wheel is turned in a clockwise direction, a torque is transmitted therefrom to the steering shaft 24 and the torsion bar 27 and the latter is deformed elastically so that the torsion occurs therebetween to resist rotational movement of the operating rod 17 which is engaged with the piston 12 while the steering shaft 24 is rotated clockwise together with the pins 64, 73 formed integrally therewith. A slight rotation of the pin 64 causes to move the valve spool 48 in the same direction from the position of FIG. 2. Then the fluid communication between the annular grooves 45 and 49 are cut off each other due to the movement of the spool 48 and the degree of fluid communication between the grooves 46 and 50 becomes larger than before. Accordingly the degree of the same between the annular groove 49 and the annular chamber 28 also becomes larger than before while the annular groove 50 and the annular chamber 28 are cut off each other and no fluid communication is occured therebetween.

Therefore, the fluid pressure supplied to the annular groove 49 from the pump 32 will be further supplied to the first fluid chamber 15 via the annular groove 33 and the passage 35 and at the same the fluid from the second chamber 14 are exhausted through passage 36, an annular groove 34, an annular space 44, a passage 80 into the reservoir 43 to create a pressure differential between the chambers 14, 15.

By the fluid pressure thus prevailing in this chamber 15, the piston 12 is caused to slide to the left in FIG. 1 and the movement thereof is transmitted from the gear rack 23 to the teeth 22 of the gear sector 21. Thence the operating rod 17 is rotated clockwise direction by means of the bearing means 18, 19 and 20 between the piston 12 and the rod 17.

The same fluid pressure as in the annular groove 49 is generated in the reaction chamber 59 due to the rightward movement of the spool valve 48, while in the other reaction chamber 60 no fluid pressure is generated, so that the valve spool 48 receives a left ward reaction force operated against the clockwise rotation of the steering wheel to maintain a good steering feeling for a driver.

Further, the free piston 66 is pushed to the left overcoming a biasing force of the spring 71 due to the clockwise rotation of the pin 73 while the free piston 65 is accepted with the shoulder portion 67a of the valve bush 67 by a biasing force of the spring 72.

But two pressure chambers 69, 70 are both communicated with the gear pump 40 via the passage 80 and conduit 38 and supplied with a fluid pressure in response to the vehicle speed. Therefore, the free piston 66 which is pushed to the left is now received a resistant force against the clockwise movement of the steering wheel due to the fluid pressure in the chamber 69 while the free piston 65 maintains to be accepted with the shoulder portion 67a of the valve bush 67 by the biasing force of the spring 72.

When the steering wheel is turned in the opposite direction, a resistant force against the counterclockwise movement of the steering wheel can be obtained due to the fluid pressure generated in response to the vehicle speed.

Althogh a preferred form of the fluid power steering mechanism of the present invention has been shown and described only one embodiment, it is understood that various other modifications can be also maintained in a manner consistent with the spirit and the scope of the invention.

What is claimed is:

1. A fluid power steering mechanism for an automotive vehicle comprising:

a. a first pressure source generating a fluid pressure, b. a second pressure source generating a fluid pressure in response to the vehicle speed, c. a main body having a gear housing and a valve housing, d. a piston within said gear housing and delineating a pair of opposed chambers therewith, said piston having a gear rack on the body thereof, e. a gear sector meshing with said gear rack and operably connected with dirigible wheels, f. an operating rod provided axially within said main body and engaging with said piston, g. a manually operable steering shaft coaxially with said operating rod and elastically connected with the same through a resilient means, h. a control valve means provided in said operating rod within said valve housing and operating said piston by relative rotational displacement of said operating rod and steering shaft, and i. a resistant means in said operating rod within said valve housing and engaging with said steering shaft, said resistant means communicating with said second pressure source thereby generating a steering resistance in response to the vehicle speed.

2. A fluid power steering mechanism of claim 1 wherein said control valve means and resistant means are positioned appart from the axial center of said operating rod and engaging with a pair of pins integrally formed with said steering shaft respectively to cooperate therewith.

3. A fluid power steering mechanism of claim 2 wherein said control valve means and resistant means are provided in a pair of bores respectively and said pair of bores are arranged on each parallel and corresponding line with respect to the intersecting line to the axial center of said operating rod.

4. A fluid power steering mechanism of claim 1 wherein said resistant means comprising a valve bush, a pair of free pistons slidable within said bush, a pair of pressure chambers provided within said valve bush and separated by said free pistons, said two chambers communicating with said second pressure source.

5. A fluid power steering mechanism of claim 1 wherein said second pressure source is provided within a transmission mechanism and generates a fluid pressure in response to the vehicle speed.

* * * * *